(12) United States Patent
Ding et al.

(10) Patent No.: US 9,914,649 B2
(45) Date of Patent: Mar. 13, 2018

(54) ELECTRO-CATALYTIC CONFORMAL COATINGS AND METHOD FOR MAKING THE SAME

(71) Applicant: GEORGIA TECH RESEARCH CORPORATION, Atlanta, GA (US)

(72) Inventors: Dong Ding, Atlanta, GA (US); Meilin Liu, Alpharetta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 216 days.

(21) Appl. No.: 14/707,834

(22) Filed: May 8, 2015

(65) Prior Publication Data

US 2015/0325860 A1 Nov. 12, 2015

Related U.S. Application Data

(60) Provisional application No. 61/990,744, filed on May 9, 2014.

(51) Int. Cl.
*H01M 4/00* (2006.01)
*H01M 4/90* (2006.01)
(Continued)

(52) U.S. Cl.
CPC ........... *C01G 51/56* (2013.01); *C01G 51/006* (2013.01); *H01M 4/8621* (2013.01);
(Continued)

(58) Field of Classification Search
CPC . H01M 4/9033; H01M 4/8605; H01M 4/8657
See application file for complete search history.

(56) References Cited

U.S. PATENT DOCUMENTS

| 8,802,316 B1* | 8/2014 | Liu | ...................... | H01M 8/1213 |
| | | | | 429/479 |
| 2005/0214612 A1* | 9/2005 | Visco | .................. | C01B 13/0255 |
| | | | | 429/482 |

(Continued)

OTHER PUBLICATIONS

Kostogloudis '97 (Preparation and Characterization of Pr1-xSrxMnO3-δ (x=0, 0.15, 0.3, 0.4, 0.5) as a Potential SOFC Cathode Material Operating at Intermediate Temperatures (500-700 C), Journal of the European Ceramic Society, 1997, 17, 1513-1521).*

(Continued)

*Primary Examiner* — Matthew J Merkling
(74) *Attorney, Agent, or Firm* — Troutman Sanders LLP; Ryan A. Schneider

(57) ABSTRACT

A composition of matter is disclosed which is a perovskite having a composition $A_{2-x}A'_xB_{2-y}B'_yO_{6-\delta}$, where A is a praseodymium (Pr) element at the A-site of the perovskite, A' is a strontium (Sr) element at the A-site of the perovskite, B is a cobalt (Co) element at the B-site of the perovskite, and B' is a manganese (Mn) element at the B-site of the perovskite, and where $0<x \leq 1$ and $0<y<2$. Also disclosed is an electrode material Conformally coated with the composition of matter. Also disclosed are methods of producing the composition of matter and conformally coating the electrode material. Also disclosed an electrode is conformally coated with a praseodymium strontium manganese perovskite and a method for the coating.

18 Claims, 13 Drawing Sheets

(51) Int. Cl.
*C01G 51/00* (2006.01)
*H01M 4/86* (2006.01)
*H01M 8/124* (2016.01)

(52) U.S. Cl.
CPC ......... *H01M 4/8657* (2013.01); *H01M 4/905* (2013.01); *H01M 4/9033* (2013.01); *C01P 2002/34* (2013.01); *C01P 2002/72* (2013.01); *C01P 2002/76* (2013.01); *C01P 2002/77* (2013.01); *C01P 2002/82* (2013.01); *C01P 2004/03* (2013.01); *H01M 2008/1293* (2013.01)

(56) References Cited

U.S. PATENT DOCUMENTS

2006/0257703 A1* 11/2006 Qi ...................... H01M 8/0276
  429/495
2007/0082254 A1* 4/2007 Hiwatashi ........... H01M 4/9033
  429/489

OTHER PUBLICATIONS

Kostogloudis '98 (The Perovskite Oxide System Pr1-xSrxCo1-yMnyO3-δ: Crystal Structure and Thermal Expansion, Journal of the European Ceramic Society, 1998, 18, 2209-2215).*

* cited by examiner

ELECTRO-CATALYTIC CONFORMAL COATINGS AND METHOD FOR MAKING THE SAME

CROSS-REFERENCE TO RELATED APPLICATIONS AND PRIORITY CLAIM

This application claims priority to U.S. Provisional Patent Application No. 61/990744 filed 9 May 2014 and entitled "Efficient Electro-Catalyst Conformal Film Coatings For Enhancing Activity And Stability Of SOFC Cathodes."

FIELD

The disclosure relates generally to materials for electochemical conductors for fuel cells or batteries. More specifically, the disclosure relates to materials and conductors for solid-oxide fuel cells.

BACKGROUND

The goal of a sustainable supply of clean and economical energy has stimulated intensive research in fuel cell technologies, which could provide electricity with high conversion efficiency and low environmental impact. Among all types of fuel cells, solid oxide fuel cells (SOFCs) are exceptional because they are less dependent on precious metal catalysts and are capable of using hydrocarbon fuels. One challenge for the commercial application of SOFCs is the high operating temperature which currently mandates the use of expensive packaging and interconnect materials. The enhancement of cathode activity is the bottleneck to reduce the operation temperature, because the oxygen reduction reaction (ORR) kinetics slow down exponentially as the temperature is decreased.

A good SOFC cathode needs both high oxygen exchange kinetics and high conductivity of both ions and electrons. To date, various cathode materials, including conventional $La_{1-x}Sr_xMnO_{3-\delta}$, (LSM) and $La_{0.6}Sr_{0.4}Co_{0.2}Fe_{0.8}O_{3-\delta}$ (LSCF), and newly developed $Sm_{0.5}Sr_{0.5}CoO_{3-\delta}$, (SSC), $Ba_{0.5}Sr_{0.5}Co_{0.8}Fe_{0.2}O_{3-\delta}$ (BSCF), $PrBaCo_2O_{5+\delta}$ (PBC) as well as their derivatives, have been developed for SOFCs. Though the newly developed cathode materials show higher ORR activity, especially at intermediate temperature range, their unproven long-term stability and inadequate compatibility with electrolyte and other cell components, especially at the high temperatures required for fabrication, limit further application in SOFCs. The state-of-the-art cathode materials are still LSM (>800° C.) and LSCF (<750° C.). The main issue of LSM cathode is the extremely low oxygen ion conductivity in intermediate temperatures range (600-750° C.) which would limit ORR. For LSCF, the catalytic activity is likely limited by the surface catalytic properties. There is an additional concern about long-term stability of LSCF, due possibly to the change of surface state in LSCF. To counter these issues and develop intermediate temperature SOFCs, a surface modification technique has been developed to apply novel cathode catalytic materials to the well-established LSCF cathode material. The porous LSCF backbone serves as a "highway" for the transport of both oxygen ions and electrons because of its excellent ambipolar conductivity, while the surface functional layer could modify the surface properties of LSCF to offer higher electro-catalytic activity and greater stability. In previous studies, discontinuous coatings of SSC, $La_{0.4875}Ca_{0.0125}Ce_{0.5}O_{2-\delta}$ (LCC) and $Ce_{0.8}Sm_{0.2}O_{1.9}$ (SDC) were all found to expedite the oxygen reduction on the surface due to their own high catalytic activity. Meanwhile, a conformal thin film coating of LSM enhanced the LSCF cathode stability through inhibition of SrO segregation.

SUMMARY

A composition of matter is disclosed where the composition of matter is a perovskite having a composition $A_{2-x}A'_xB_{2-y}B'_yO_{6-\delta}$ where A is a praseodymium (Pr) element at the A-site of the perovskite, A' is a strontium (Sr) element at the A-site of the perovskite, B is a cobalt (Co) element at the B-site of the perovskite, and B' is a manganese (Mn) element at the B-site of the perovskite, and where $0<x\leq1.2$ and $0<y<2$.

In one embodiment of the composition of matter $x>0$ and $y>0$, such that the composition of matter is praseodymium strontium cobalt manganese oxide (PSCM). In another embodiment of the composition of matter $0.2<x\leq1.1$ and $0.2<y<1.9$. In another embodiment of the composition of matter $0.4<x\leq1.2$ and $0.8<y<1.2$. In another embodiment of the composition of matter $x=1$ and $y=1$, such that the composition of matter is $PrSrCoMnO_{6-\delta}$.

A electrode is also disclosed which has a porous mixed ionic-electronic conductor (MIEC) which also has an oxygen-reducing catalyst coating. In one embodiment the oxygen-reducing catalyst is a perovskite having a composition $A_{1-x}A'_xBO_{3-\delta}$ where A is a praseodymium (Pr) element at the A-site of the perovskite, A' is a strontium (Sr) element at the A-site of the perovskite, and B is a manganese (Mn) element at the B-site of the perovskite, and where $0\leq x<1$.

In another embodiment of the electrode the oxygen-reducing catalyst is a perovskite having a composition $A_{2-x}A'_xB_{2-y}B'_yO_{6-\delta}$ where A is a praseodymium (Pr) element at the A-site of the perovskite, A' is a strontium (Sr) element at the A-site of the perovskite, B is a cobalt (Co) element at the B-site of the perovskite, and B' is a manganese (Mn) element at the B-site of the perovskite, and where $0<x\leq1.2$ and $0<y<2$. In another embodiment of the electrode $x>0$ and $y>0$, such that the oxygen-reducing catalyst coating is praseodymium strontium cobalt manganese (PSCM). In another embodiment of the electrode $0.2<x\leq1.2$ and $0.2<y<1.9$. In another embodiment of the electrode $0.4<x\leq1.1$ and $0.8<y<1.2$. In another embodiment of the electrode $x=1$ and $y=1$, such that the oxygen-reducing catalyst coating is $PrSrCoMnO_{6-\delta}$.

A solid-oxide fuel cell is also disclosed, having an electrolyte, an anode electrically coupled to a first surface of the electrolyte, and a cathode electrically coupled to a second surface of the electrolyte. The cathode is a porous mixed ionic-electronic conductor (MIEC) has an oxygen-reducing catalyst coating, where, the oxygen-reducing catalyst is a perovskite having a composition $A_{2-x}A'_xB_{2-y}B'_yO_{6-\delta}$ where A is a praseodymium (Pr) element at the A-site of the perovskite, A' is a strontium (Sr) element at the A-site of the perovskite, B is a cobalt (Co) element at the B-site of the perovskite, and B' is a manganese (Mn) element at the B-site of the perovskite, and where $0<x\leq1.2$ and $0<y<2$. In another embodiment the oxygen-reducing catalyst coating of the cathode $x>0$ and $y>0$, such that the oxygen-reducing catalyst coating is praseodymium strontium cobalt manganese (PSCM). In another embodiment the oxygen-reducing catalyst coating of the cathode $0.2<x\leq1.2$ and $0.2<y<1.9$. In another embodiment the oxygen-reducing catalyst coating of the cathode $0.4<x\leq1.1$ and $0.8<y<1.2$. In another embodiment the oxygen-reducing catalyst coating of the cathode $x=1$ and $y=1$, such that the oxygen-reducing catalyst coating is PrSrCoMnO6−δ.

In another embodiment of the solid-oxide fuel cell the oxygen-reducing catalyst coating has a thickness in a range from about 2 to about 30 nm. In another embodiment of the solid-oxide fuel cell the oxygen-reducing catalyst coating is a continuous film. In another embodiment of the solid-oxide fuel cell the porous mixed ionic-electronic conductor is lanthanum strontium cobalt ferrite (LSCF).

DETAILED DESCRIPTION

To facilitate an understanding of the principals and features of the disclosed technology, illustrative embodiments are explained below. The compounds and components described hereinafter as making up various elements of the disclosed technology are intended to be illustrative and not restrictive. Many suitable compounds or components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

By "blank" or "un-infiltrated" or "uncoated" is meant that a surface coating has not been applied to the substance or component in question. By "infiltrated" or "coated" or "conformally coated" is meant that a surface coating has been applied to the substance or component in question.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Figure 1:
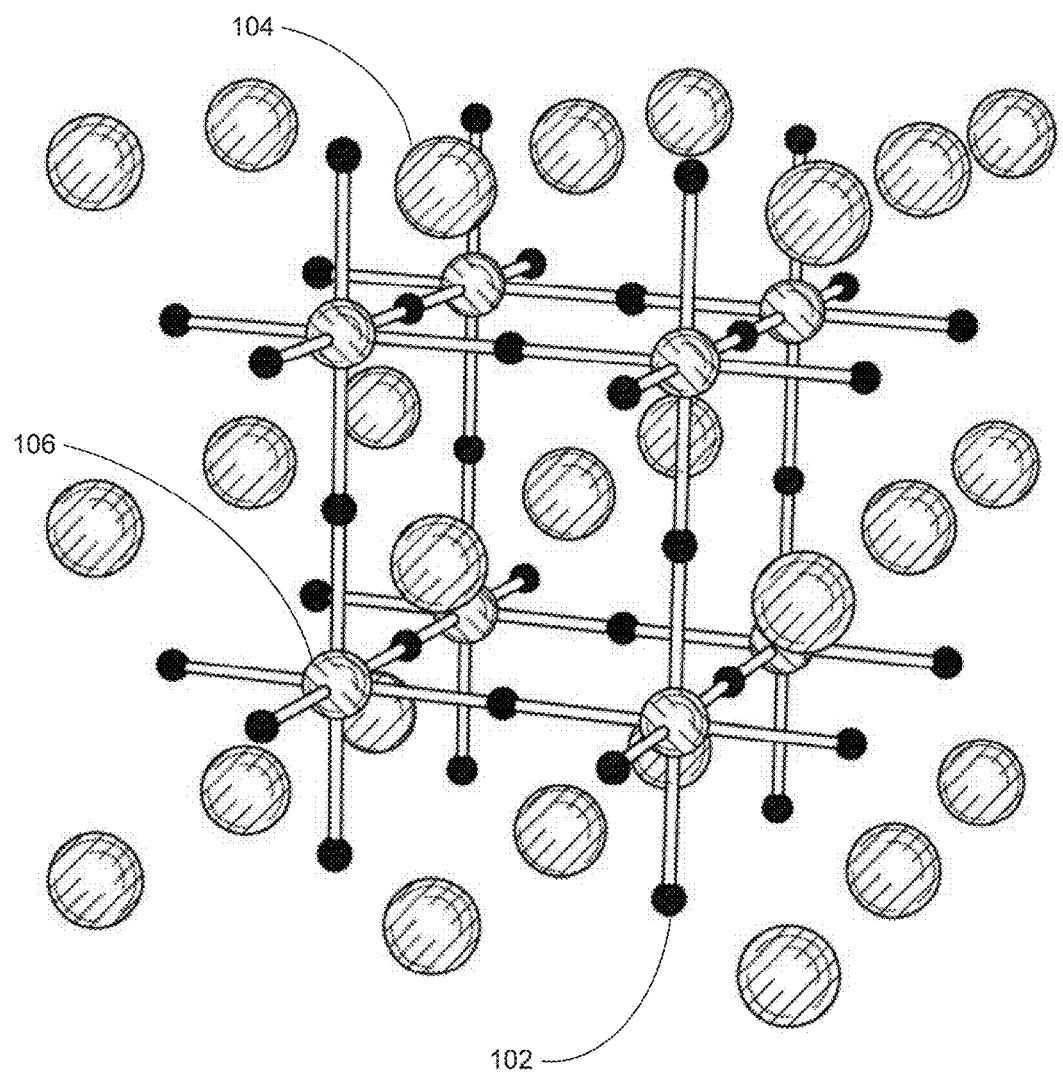
FIG. 1 is a diagram of the crystal structure of a generic perovskite illustrating the positions of the A and B cations relative to the oxides in accordance with the present disclosure.

Referring now to the Figures, in which like reference numerals represent like parts, various embodiments of the compounds, cathodes, coatings, and methods will be disclosed in detail. FIG. 1 is a diagram of the crystal structure of a generic perovskite material. Perovskite materials have the same general crystalline structure as calcium titanium oxide ($CaTiO_3$). This is known as the perovskite structure. The general chemical formula for perovskite compounds is $ABX_3$, where the 'A' cations 104 and the 'B' cations 106 are different sizes. X 102 is an anion that bonds to both. The 'A' atoms 104 are larger than the 'B' 106 atoms. The ideal cubic-symmetry structure has the B cation 104 in 6-fold coordination, surrounded by an octahedron of anions 102, and the A cation 106 in 12-fold cuboctahedral coordination. In some embodiments, slight buckling and distortion are possible, resulting in distorted structures.

This disclosure describes two perovskite compounds and certain applications of those compounds: $Pr_{0.75}Sr_{0.2}MnO_{3-\delta}$ (PSM) and a new perovskite compound, $PrSrCoMnO_{6-\delta}$ (PSCM). As explained in this disclosure, these compounds may be useful as conformal catalytic coatings for porous electrochemical cathodes, among other uses. PSM and PSCM are both derivatives of the doped lanthanide manganite structure, an extensively explored group of materials exhibiting good performance as SOFC cathode materials. In certain embodiments, the perovskite structure of PSM and PSCM allows them to form a conformal coating on LSCF, which is also a perovskite, as well as other perovskite materials. A desire for superior oxygen exchange activity motivated the choice of Pr in the A site 104. Similar performance is sometimes noted by this element in both the $Ln_{1-x}Sr_xMnO_{3-\delta}$ series and $LnSrCoMnO_{6-\delta}$ series of materials (where Ln represents the lanthanide elements from Ln to Gd). A desire to increase the catalytic activity without giving up all of the benefit of stability motivated the choice to substitute cobalt in the B site of lanthanide manganite. Some perovskite cathodes with Mn in the B-site are known for their stability over long term operation while some cobaltites show higher ionic and electronic conductivities.

Figure 3:
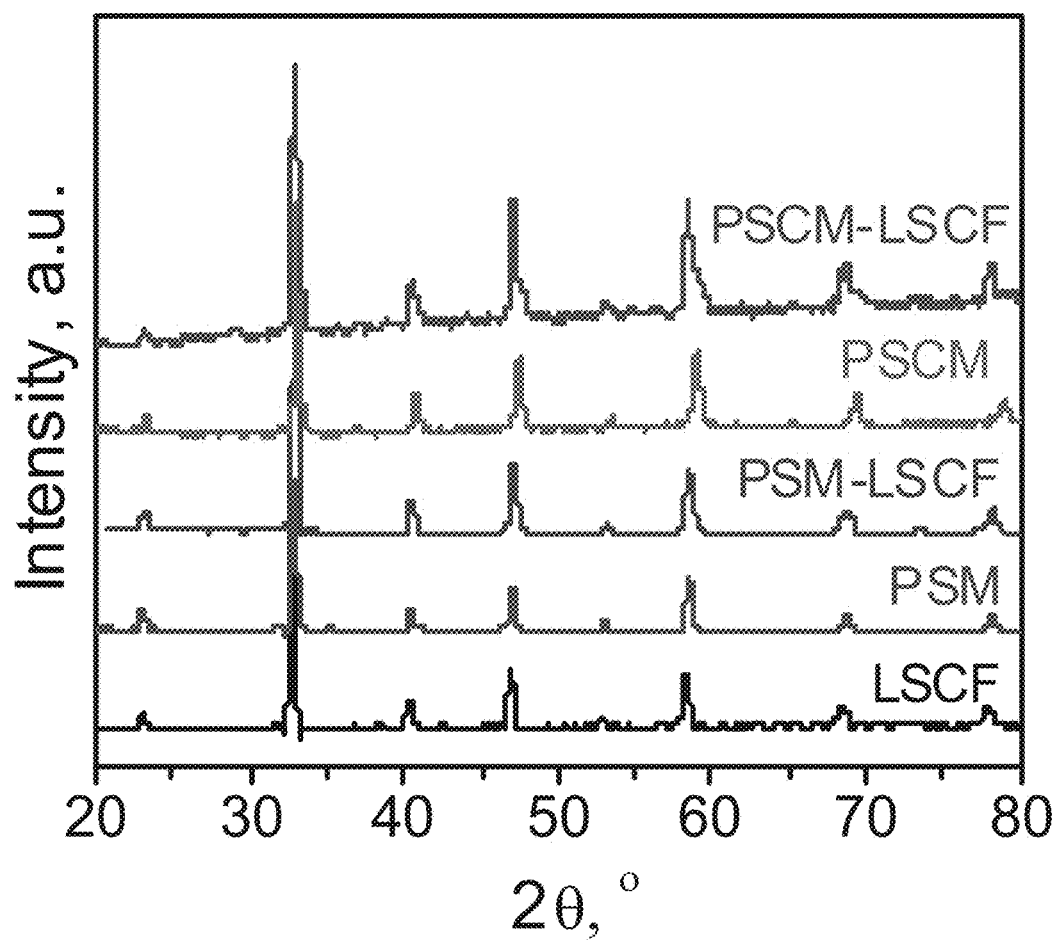
FIG. 3 is a graph of the X-ray diffraction patterns of LSCF, PSM, PSCM and their composites illustrating the molecular structure of the material in accordance with the present disclosure.

FIG. 3 is a graph of the X-ray diffraction (XRD) patterns of LSCF, PSM, PSCM and their composites after being fired at 900° C. for one hour. For example, PSM maintains a similar single perovskite structure to LSM, with slight peak shifts toward high angles in its XRD pattern. The shifting is expected because the ionic radius of $Pr^{3+}$ is smaller than that of $La^{3+}$.

Figure 4:
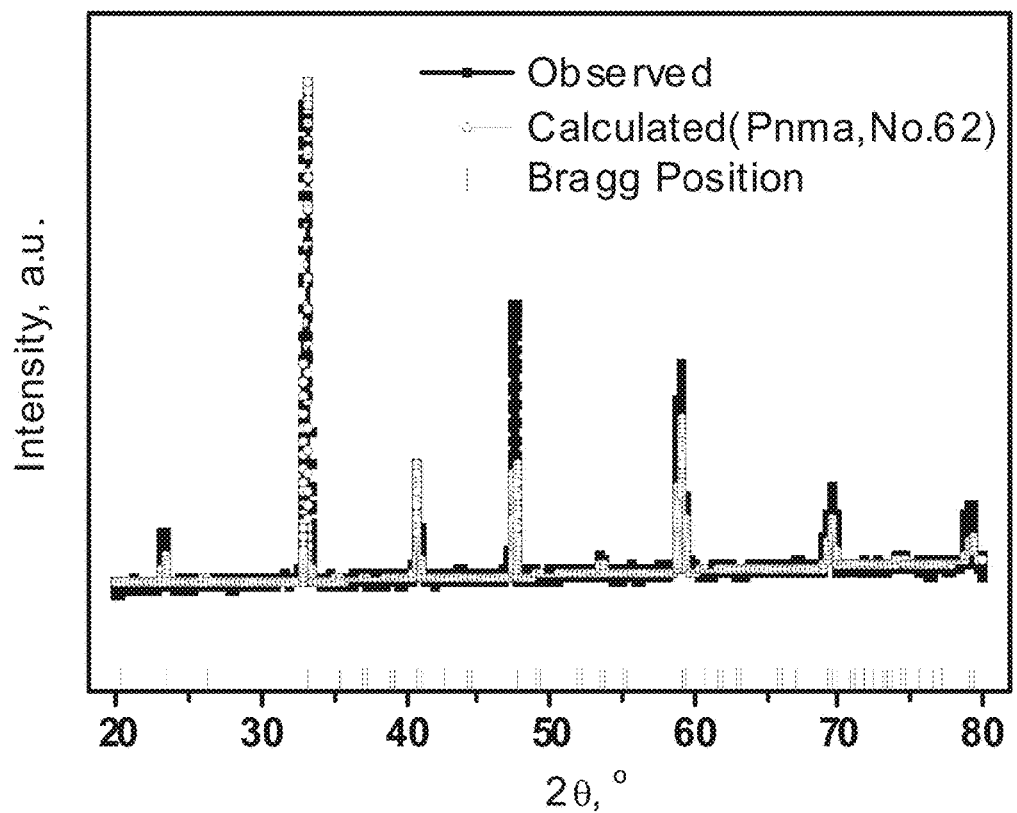
FIG. 4 is a graph of the observed and calculated X-ray diffraction patterns for PSCM and their associated Bragg patterns illustrating the molecular structure of the material, in accordance with the present disclosure.

FIG. 4 is a graph of the observed and calculated XRD patterns for PSCM powders and their associated Bragg patterns after annealing at 1150° C. 5 hours. The higher annealing temperature and duration provide better-fitting results to identify the phase and structure of PSCM. Phase identification of X-ray diffraction data suggests that the PSCM sample is a complex perovskite with an orthorhombic symmetry. The unit cell structure for the material was determined using the Rietveld method (via the X'Pert Highscore Plus program with the selected structure models). Refinement using the Pnma (No. 62) improves the fit for the main diffraction peaks and yields better agreement factors for orthorhombic space group than monolithic, tetragonal, and cubic space group. The estimated structural parameters of PSCM (via the Rietveld method) are summarized in Table 1:

TABLE 1

Estimated structural parameters of PSCM by Rietveld method

| Space group | Pnma(No. 62)[a] |
|---|---|
| a(Å) | 5.3802(8) |
| b(Å) | 7.6318(4) |
| c(Å) | 5.4204(3) |
| V(Å$^3$) | 222.57(1) |
| Z | 4 |
| δ(nominal) | 0.07 |
| <Mn/Co—O> (Å) | 1.932(1)[b] |

[a]Atomic crystal sites are adopted from as: Pr/Sr, 4c(x, □, z); Mn/Sr, 4b(x, y, □); O(1), 4c(x, □, z); O(2), 8d(x, y, z); x, y, z are refinement parameters.
[b]Mn/Co—O(1), 1.923(1) Å × 2; Mn/Co—O(2), 1.902(1) Å × 2; Mn/Co—O(2), 1.970(1) Å × 2

Figure 2:
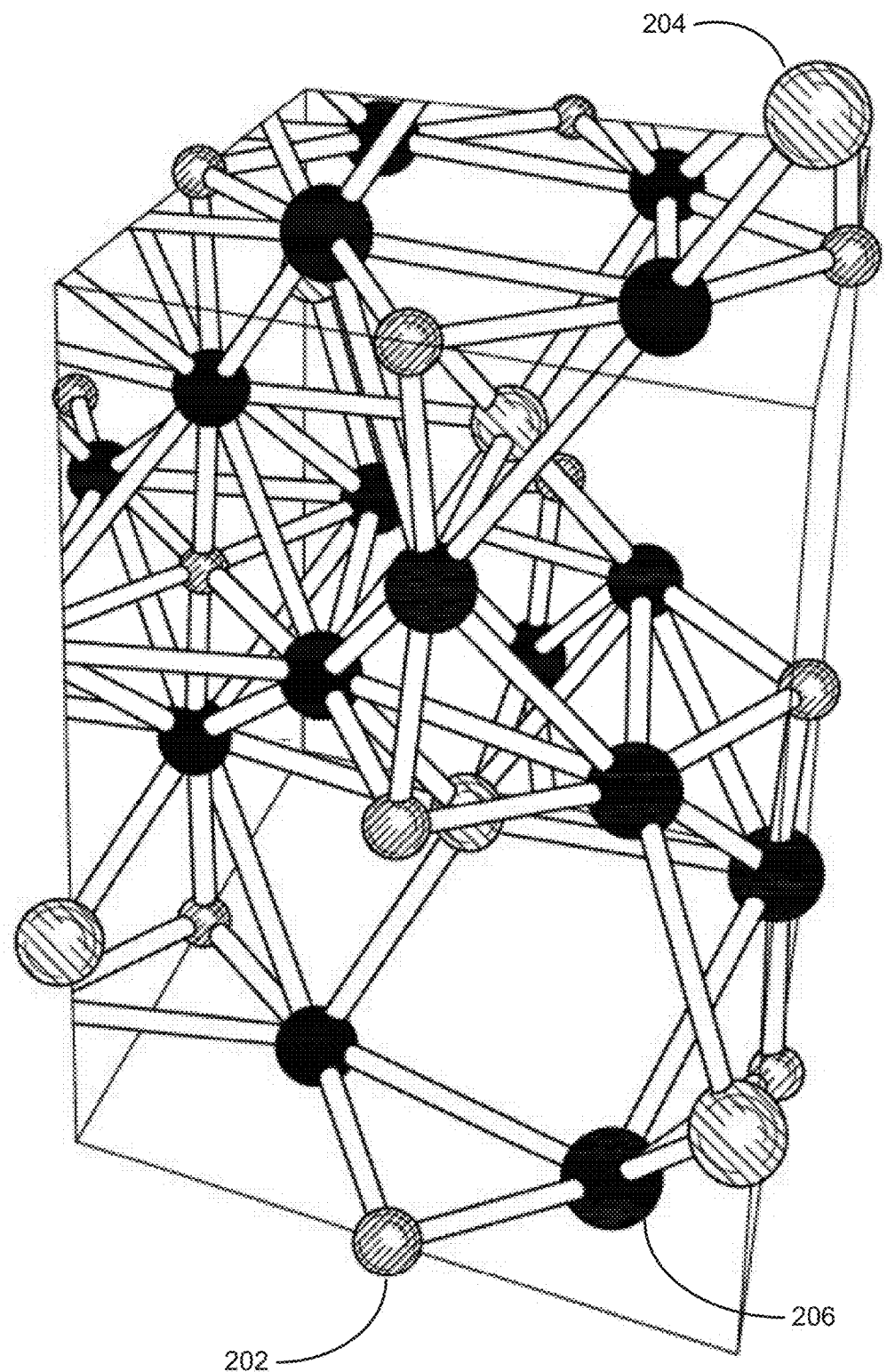
FIG. 2 is a diagram of the crystal structure of a complex perovskite illustrating the positions of the A and B cations relative to the oxides in accordance with the present disclosure.

FIG. 2 is a diagram of the crystal structure of a complex perovskite having the general formula $ABX_3$ and the structural parameters of Table 1. FIG. 2 illustrates the positions of the A and B cations relative to the oxide, X. The 'A' cations 204 and the 'B' cations 206 are different sizes and X 202 is an anion that bonds to both. The 'A' atoms 204 are larger than the 'B' 206 atoms. The Mn/Co cations are randomly distributed at the centers of the $BO_6$ octahedrons, while O anions occupy the corners. Pr/Sr cations are at the center of layer surrounded by the tilted $BO_6$ octahedrons.

Therefore, based on structural analysis of the XRD patterns (i.e., FIG. 3), the B-cations (i.e., Mn/Co) in the PSCM complex perovskite are disordered with no preferential ordering. A complex perovskite differs from a double perovskite because in a double perovskite the B-site cations are ordered and thus have preferential positions.

Figure 5:
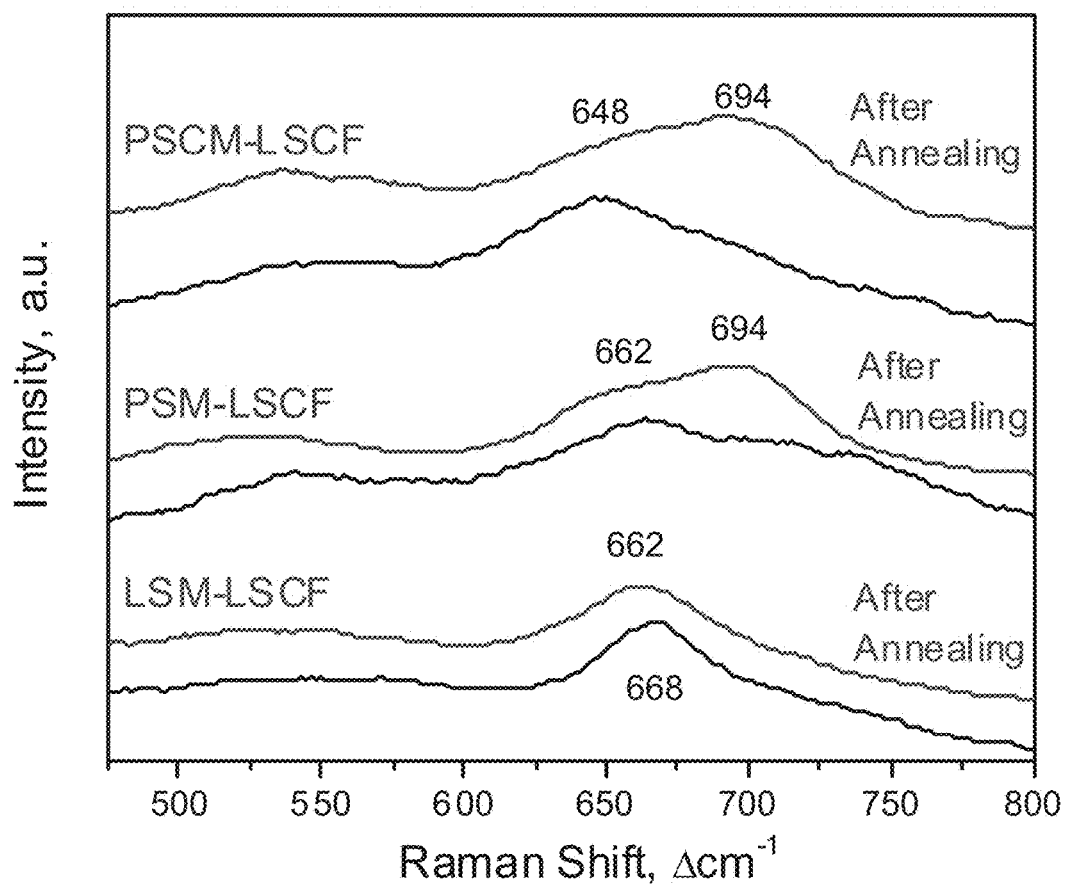
FIG. 5 is a graph of the Raman spectra for LSM-LSCF, PSM-LSCF, and PSCM-LSCF catalyst-cathode samples before and after annealing and illustrating implicit changes in the structure of the catalyst and/or cathode materials, in accordance with the present disclosure.

FIG. 5 is a graph of the Raman spectra for LSM-LSCF, PSM-LSCF, and PSCM-LSCF conformal catalyst-cathode samples before and after annealing at 1000° C. for 100 hours. FIG. 5 illustrates the implicit changes in the structure of the catalyst and/or cathode materials resulting from the annealing. In each of the samples, the broad set of Raman bands between 600 and 750 $cm^{-1}$ correspond to vibrations involving the B-site cations and oxygen anions in the bulk material. In the LSM-LSCF spectrum, this band is nearly symmetric in character. After annealing, the band retained its shape but its center shifts slightly from 668 to 662 $cm^{-1}$, likely corresponding to an exchange of Mn, Co, and Fe ions taking place within the bulk material over the course of the annealing. This exchange forms a single "LSMCF" interphase between LSM and LSCF. In the PSM-LSCF and PSCM-LSCF spectra before annealing, the left side of this band was slightly more prominent. After annealing, however, the right shoulder of the band (694 $cm^{-1}$) became more pronounced, indicating a greater distortion in the lattice than in the LSM-LSCF. This likely results from changes in the A cation site. In similar materials, this Raman band changed similarly when different ions were doped in the A-site. Therefore, in the PSM-LSCF and PSCM-LSCF cases, some exchange is potentially taking place between the Pr, La, and Sr ions at the annealing temperatures. The formation of a "LPSMCF" perovskite phase is a likely result. However, the Raman analysis did not indicate the formation of an undesirable, non-perovskite secondary phase.

Figure 6:
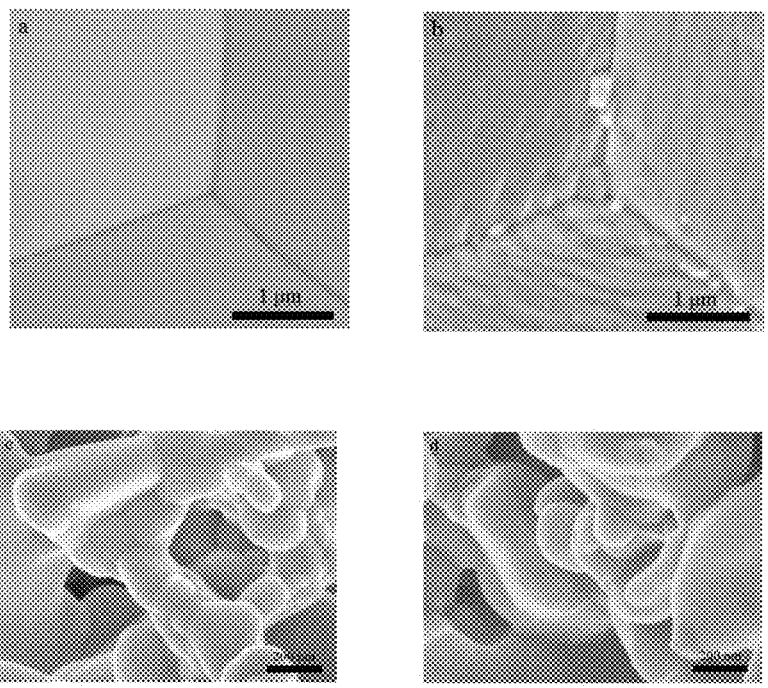
FIG. 6 is a group of scanning electron microscope micrographs of coated and uncoated LSCF materials illustrating their relative surface roughness in accordance with the present disclosure.

FIG. 6 is a scanning electron microscope (SEM) micrograph showing the typical surface morphology of: (a) an uncoated LSCF pellet; (b) a PSCM coated LSCF pellet; (c), a porous uncoated LSCF cathodes; and (d) a PSCM coated porous LSCF cathodes. Grains of the uncoated LSCF pellet are very smooth with clear triple junctions. With PSCM coating, the continuous and dense film is visible on the surface of LSCF grain, making it rough and very different from the typical microstructures brought on by infiltration-induced particle deposition. A high contrast is visible even across different grains. When catalyst infiltrations are applied to actual porous LSCF cathodes, the surface morphologies are similar to the uncoated counterparts.

Figure 7:
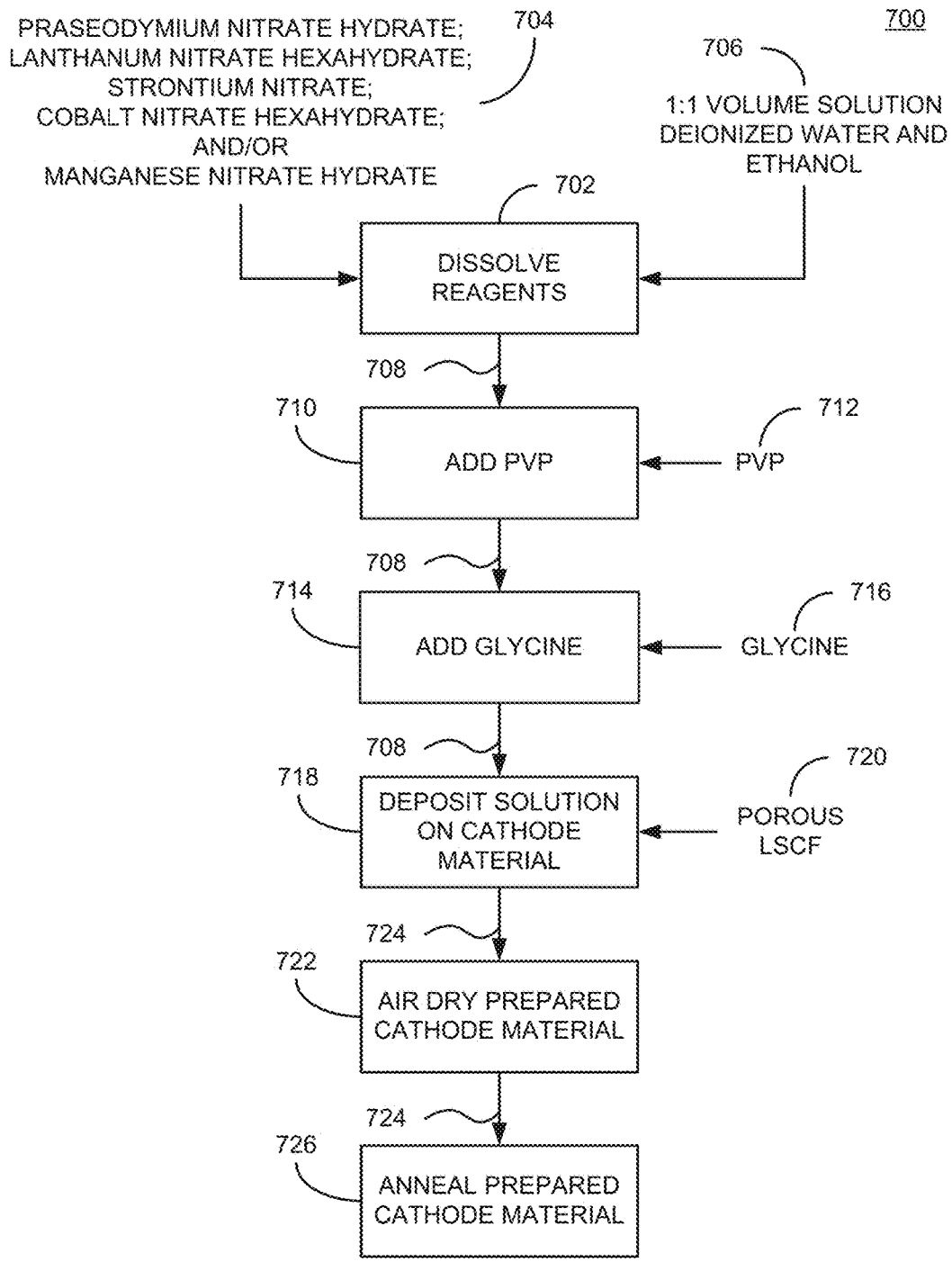
FIG. 7 is a flow chart showing the process of preparing LSM, PSM and/or PSCM infiltration solutions and the process of applying the catalytic coating to porous cathode material, in accordance with the present disclosure.

Method of Preparing LSM, PSM and PSCM Infiltration Solutions and Catalytic Coating:

FIG. 7 is a flow chart showing the process 700 of preparing LSM, PSM and PSCM infiltration solutions and the process of applying the catalytic coating to porous cathode material. At 702 stoichiometric amounts of high-purity praseodymium nitrate hydrate, lanthanum nitrate hexahydrate, strontium nitrate, cobalt nitrate hexahydrate, and manganese nitrate hydrate 704 are dissolved (each as required, based on the coating desired) into a solution 706 of deionized water and ethanol with volume ratio of 1:1 water to ethanol. This forms a catalytic precursor 0.1 mol/L stock solution 708. At 710 5% wt. of polyvinyl pyrrolidone (PVP) 712 is added to the stock solution 708 as a surfactant. At 714 a stoichiometric amount of glycine 716 is added to the stock solution 708 as a complexing agent and as the fuel for subsequent self-combustion. At 718 5 µL of the stock solutions is deposited on the as-prepared surface of the porous LSCF 720. At 722 the porous LSCF treated with the catalytic precursor solution 724 is allowed to dry overnight in ambient air. At 726 the dried porous LSCF treated with the catalytic precursor solution 724 is annealed at 900° C. for 1 hour. In the preferred embodiment, the samples are heated at 2° C./minute to reach the 900° C. annealing temperature. In the preferred embodiment, the samples are also cooled at 2° C./minute. Controlled heating and cooling rates are believed to ensure even coating rather than discrete particles, which might result from heating or cooling too quickly.

In order to identify the phase of the proposed catalysts, PSM and PSCM powders were synthesized using the same solution process as for coating. After self-combustion, the ashes were collected and fired at 900° C. for 1 hour. The structural analysis for the PSM and PSCM powders are discussed above.

Method of Fabricating Symmetrical Cells as Well as Three-Electrode Configurations:

YSZ pellets were prepared by uniaxially pressing a commercially available YSZ powder into a "green" pellet. The "green" pellets were then sintered at 1450° C. for 5 hours to achieve a relative density of ~98%. LSCF. "Green" tapes prepared by tape-casting were then bound onto both sides of a YSZ pellet using a slurry of $Sm_{0.2}Ce_{0.8}O_{2-\delta}$ as a buffer layer, which was subsequently co-fired with SDC on YSZ at 1080° C. for 2 hours to form porous LSCF electrodes with an active area of 0.3 cm².

The SDC powder was synthesized using a chemical co-precipitation process. The SDC powder was then dispersed in acetone with V-006 (Heraeus, US) as binder and ball-milled for 24 hours to form a stable SDC slurry. The symmetrical cells were also employed for a three-electrode configuration. The LSCF cathode with/without catalyst coating were used as working electrode (WE) and counter electrode (CE), respectively. Platinum (Pt) paste was fired at 900° C. for 1 hour as reference electrode (RE) by positioning it as close to working electrode as possible.

Methods of Fabricating Anode-Supported Full Cells:

Tape-cast NiO/YSZ anode-support was first fabricated and pre-fired at 850° C. for 2 h. Then, an active NiO/YSZ layer (~15 μm) and a YSZ electrolyte (~15 μm) were sequentially deposited on the anode support by a particle suspension coating process followed by co-firing at 1400° C. for 5 h.[32] The LSCF cathode was then applied to the YSZ electrolyte using the same procedures for the fabrication of symmetric cells as described earlier.

The phase compositions of LSCF, PSM and PSCM powders as well as their composites were determined by XRD. LSCF powders were fired at 1080° C. for 2 hours (as the same as the fabrication process of cathode backbone). PSM and PSCM powder precursors were first obtained from a glycine-combustion method and then fired at 900° C. for 1 hour (the same as the fabrication process for their coating). Their composites were obtained by putting LSCF powders (1080° C./2 hours) into PSM and PSCM individual solution (ultimate powder weight ratio=50:50) to dry in oven and fired at 900° C. for one hour. Raman spectroscopy was performed using 514 nm laser excitation on mixed PSM-LSCF and PSCM-LSCF samples that were annealed at 1000° C. for 100 hours for further chemical analysis. The microstructure and morphology of the LSCF pellets with/without catalysts coatings were examined using a scanning electron microscope.

Coating Thickness

The thickness of the catalytic coating may be estimated from the following equation:

$$L = \frac{VCM}{\rho S} \quad (1)$$

V is solution volume, C is solution concentration, M is the molar weight of the infiltration material, ρ is the theoretical density of the infiltration material, and S is the inner surface area of porous cathode that was coated with the solution. In the experimental embodiment, V, C, and S were held constant, so that L was determined mainly by the ratios of M/ρ, which did not vary much among LSM, PSM and PSCM (from the range was 35 to 37 mol cm³ g⁻²). Therefore, the thicknesses of PSM and PSCM coatings are most likely comparable to that of the LSM coating, which is based on a prior TEM observation (in M. E. Lynch, L. Yang, W. Qin, J.-J. Choi, M. Liu, K. Blinn, and M. Liu, *Energy & Environmental Science*, 2011, 4, 2249, incorporated by reference in its entirety) varying in the 2-23 nm range.

Electrochemical Measurements:

The area-specific resistance (ASR) of the cathodes was measured in a two-electrode symmetric-cell configuration using two pieces of Pt mesh as current collector (without Pt paste to avoid the possible catalytic contribution from Pt) at 500-800° C. Impedance was measured across a broad frequency spectrum using a frequency response analyzer interfaced with an potentiostat. The amplitude was set to 10 mV, from 100 kHz to 0.1 Hz. The overpotential, η, was calculated using the following equation:

$$\eta = U_{WR} - iR_{ohm} \quad (2)$$

"$U_{WR}$" is the constant potential applied between WE and RE, "i" is the corresponding current density, and "$R_{ohm}$" is the ohmic resistance of the cell. The current response of the cell reached a steady state after the DC polarization was applied for ~30 min. To accurately determine the ohmic resistance of the cell, impedance spectra were also collected under identical DC polarization after the cell response was stabilized. The button cells were mounted on an alumina supporting tube for fuel cell testing at 750° C. with humidified hydrogen (3% H2O) as the fuel and stationary air as the oxidant. The cell performance was monitored with an Arbin multi-channel electrochemical testing system.

Figure 8:
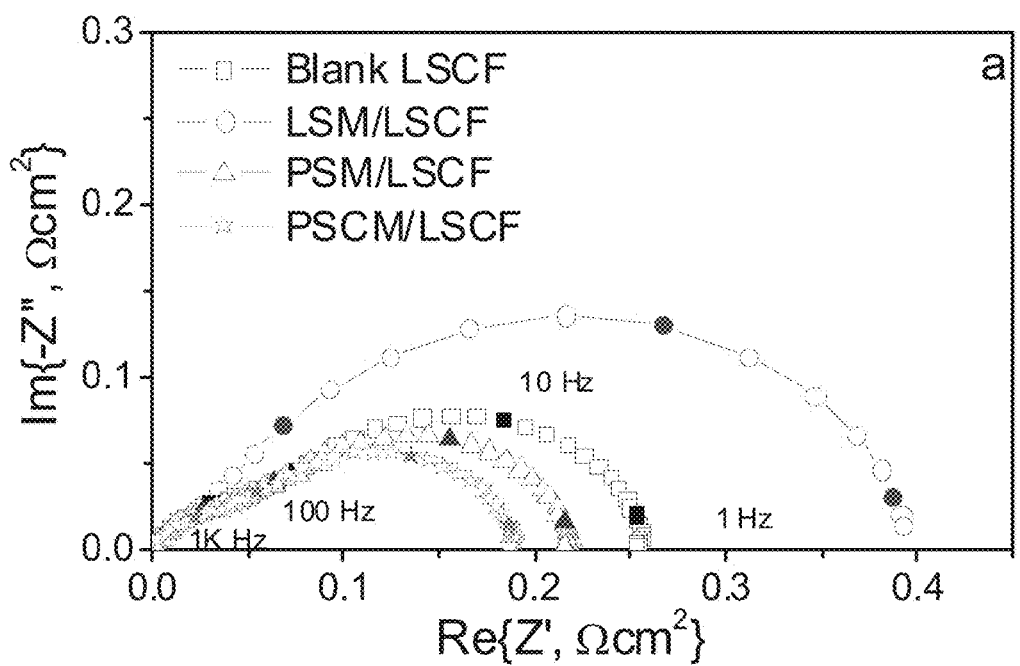
FIG. 8 is a graph of the impedance spectra of various catalyst-infiltrated LSCF cathodes illustrating their relative electrochemical performance, in accordance with the present disclosure.

FIG. 8 shows typical impedance spectra of various catalyst-infiltrated LSCF cathodes measured at 750° C. under open circuit conditions. In this case, the LSM-infiltrated LSCF cathode displays a visible increase in the impedance compared to the un-infiltrated LSCF cathode. In contrast, the PSM infiltration decreased the impedance for the cathode.

Figure 9:
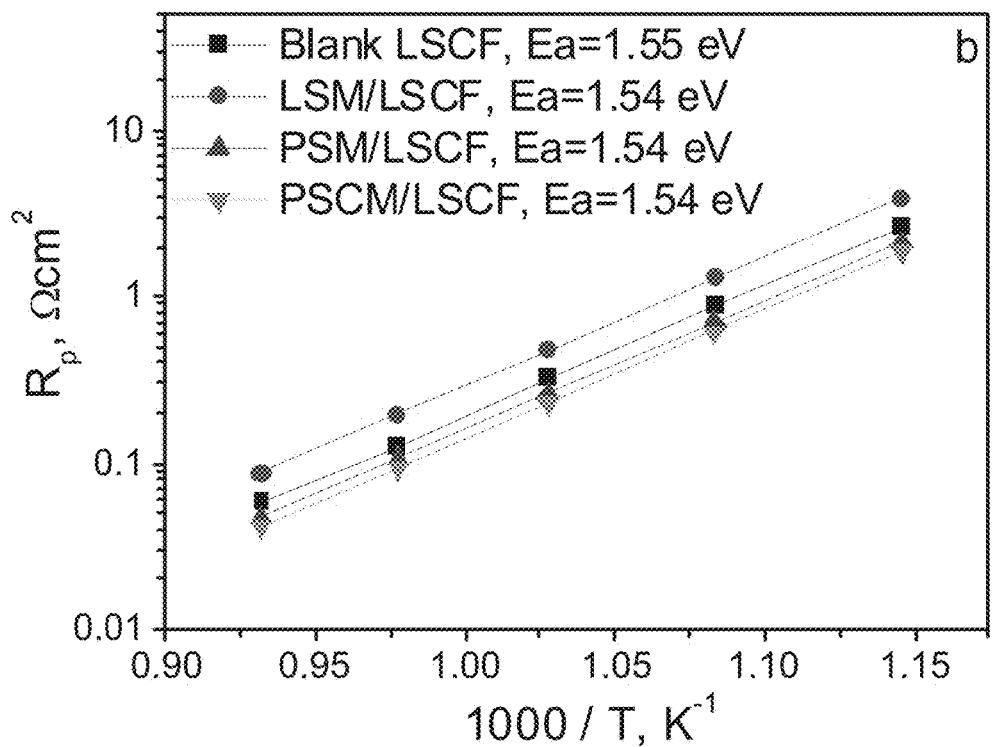
FIG. 9 is a graph of the interfacial polarization resistance versus temperature for various catalyst-infiltrated and un-infiltrated LSCF cathodes under open circuit voltage conditions illustrating their relative electrochemical performance as a function of temperature at open circuit voltage, in accordance with the present disclosure.

FIG. 9 is a graph of the interfacial polarization resistance versus temperature for various catalyst-infiltrated LSCF cathodes under open circuit voltage conditions. Clearly, the PSM infiltration significantly reduces the interfacial polarization resistance ($R_p$) of the LSCF cathode even under open-circuit voltage (OCV) condition. In contrast, LSM infiltration of the LSCF cathode appears to raise the interfacial polarization resistance. The PSCM infiltration further decreased $R_p$ relative to the PSM infiltration, at the same concentration of infiltration. For example, $R_p$ was 0.107 and 0.093 Ωcm⁻² for the PSM and PSCM infiltrated LSCF cathodes, contrasting with the 0.126 and 0.197 Ωcm⁻² for the uncoated LSCF and LSM infiltrated LSCF cathodes at 750° C.

FIG. 9 shows the temperature dependence of $R_p$ for these catalyst-infiltrated LSCF cathodes. At an intermediate temperature range, the PSCM infiltration provided the lowest $R_p$ among these Mn-containing catalysts. All of the curves appear to have similar slopes, indicating that the primary oxygen reduction reaction (ORR) mechanism of the LSCF cathodes with infiltration remains the same.

Figure 10:
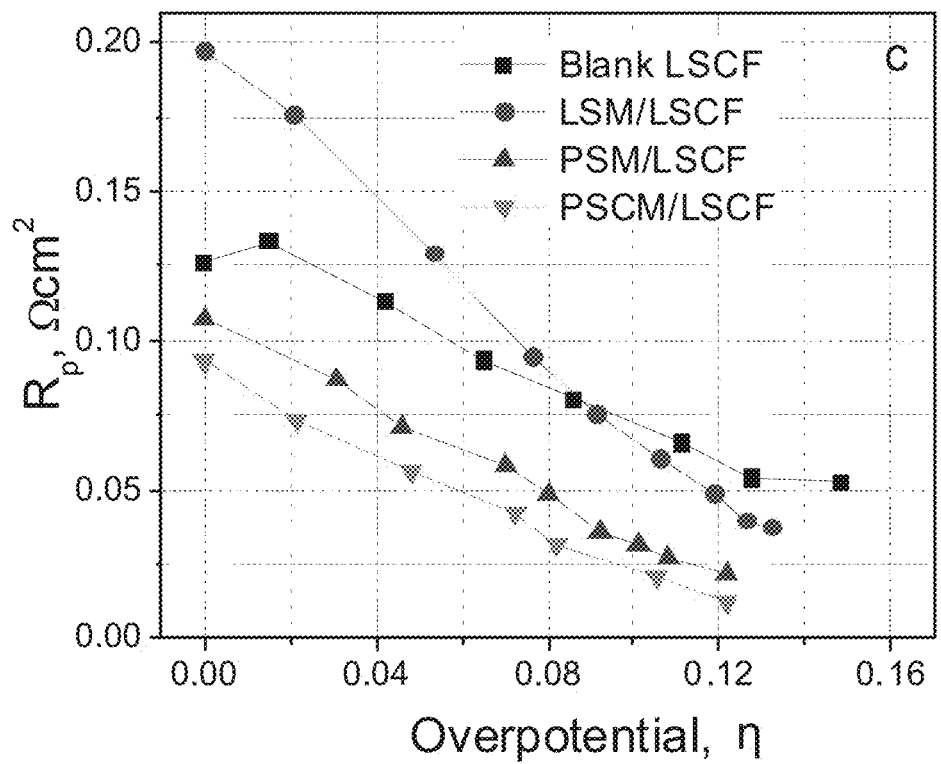
FIG. 10 is a graph of the interfacial polarization resistance versus overpotential for various catalyst-infiltrated and un-infiltrated LSCF cathodes illustrating their relative electrochemical performance under different operating conditions in accordance with the present disclosure.

FIG. 10 is a graph of the interfacial polarization resistance versus overpotential for various catalyst-infiltrated and un-infiltrated LSCF cathodes illustrating their relative electrochemical performance under different operating conditions. The test method employed symmetrical cells with a three-electrode configuration and used a steady-state polarization to evaluate these behaviors. Unlike LSM infiltration, the PSM and PSCM infiltrated LSCF cathodes initially showed lower $R_p$ compared to uncoated LSCF cathodes, followed by a fast reduction of $R_p$ at a given cathodic overpotential. This suggests that PSM and PSCM infiltration are able to result in more improvement in performance during operation.

Figure 11:
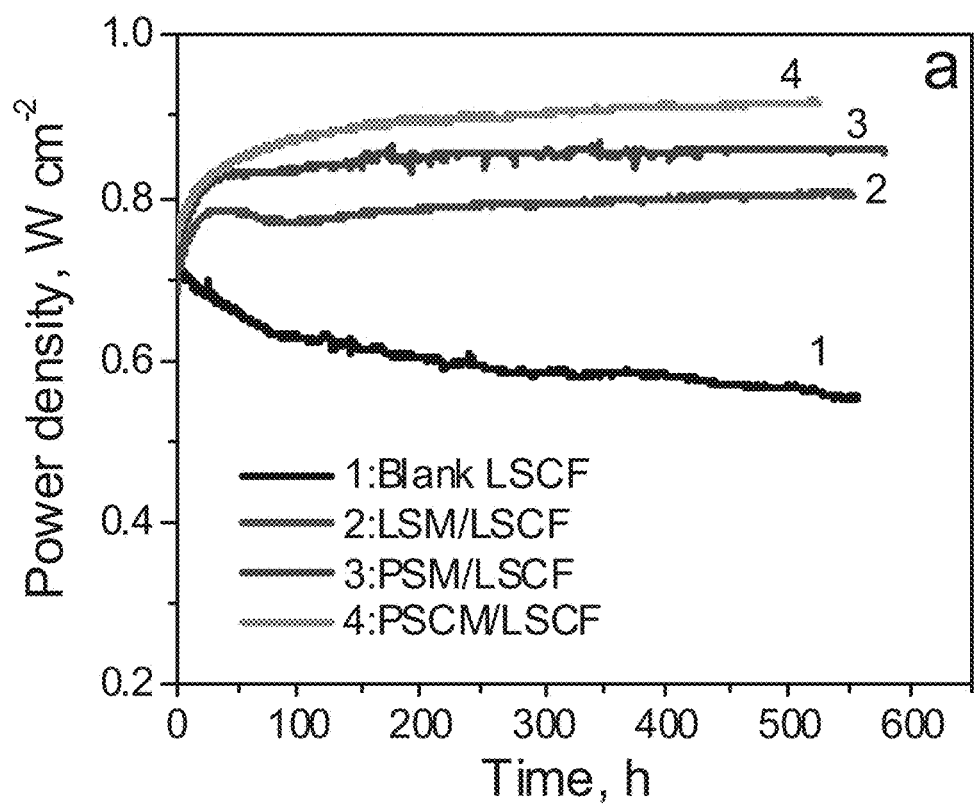
FIG. 11 is a graph of power density over time of various infiltrated and un-infiltrated cathodes anode-supported cell with a constant voltage of 0.7 V and illustrating the electrochemical performance and durability of the infiltrated cathodes relative to the un-infiltrated cathode in an actual full cell configuration under realistic operation conditions, in accordance with the present disclosure.

FIG. 11 is a graph of power density over time of various infiltrated and un-infiltrated cathodes anode-supported cell with a constant voltage of 0.7 V illustrating durability of the infiltrated cathodes relative to the un-infiltrated cathode, in accordance with the present disclosure. Compared with the uncoated cell after 500-hour operation, the performance enhancement is 41.6%, 51.5% and 61.7% for LSM, PSM, and PSCM infiltration, respectively. Due to possible degradation of the uncoated LSCF cathode during operation, more significant improvements in performance of the cells with catalyst-infiltrated LSCF cathodes are expected over the performance of a cell with an uncoated LSCF cathode. The degradation rate for the cell with the uncoated LSCF cathode is 0.035% per hour, which is lower than 0.06% per hour reported by the prior art (Simner et al, *Electrochemical Solid St.* 2006, 9, A478) under similar conditions. This suggested that the cathode tested is typical.

Figure 12:
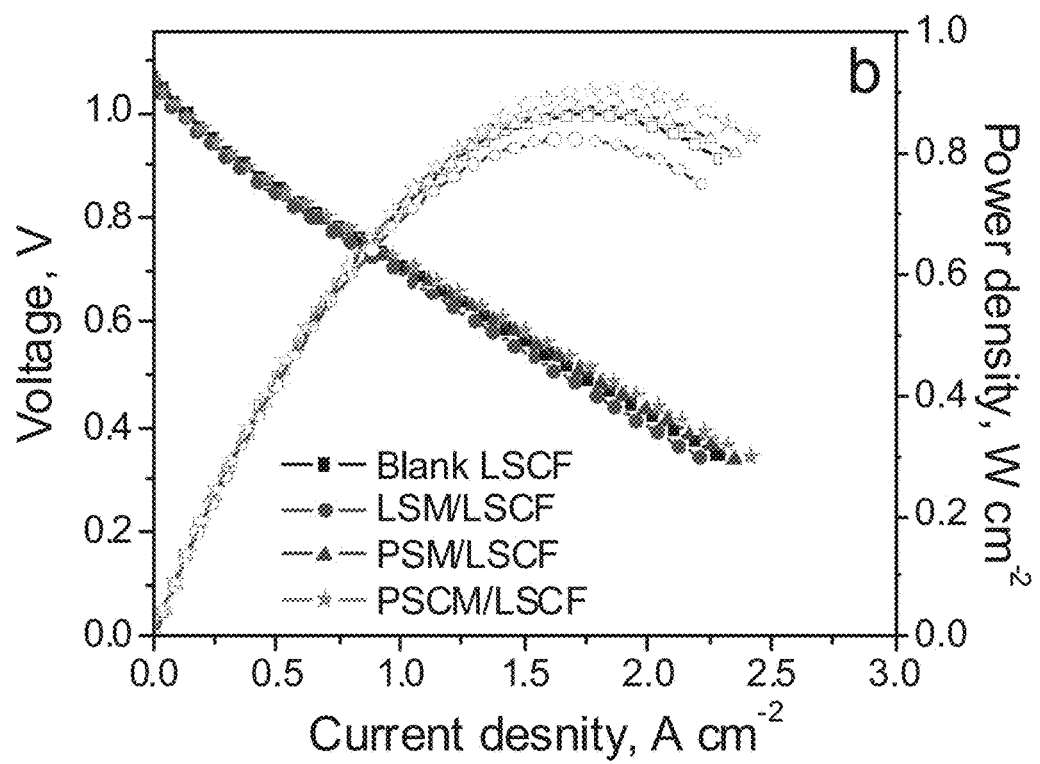
FIG. 12 is a graph of the initial current-voltage characteristics and the corresponding power densities for cells incorporating various infiltrated and un-infiltrated cathodes illustrating aspects of their relative electrochemical performance, in accordance with the present disclosure.

FIG. 12 is a graph of the initial current-voltage characteristics and the corresponding power densities for cells incorporating various infiltrated and un-infiltrated cathodes illustrating aspects of their relative electrochemical performance, in accordance with the present disclosure.

Figure 13:
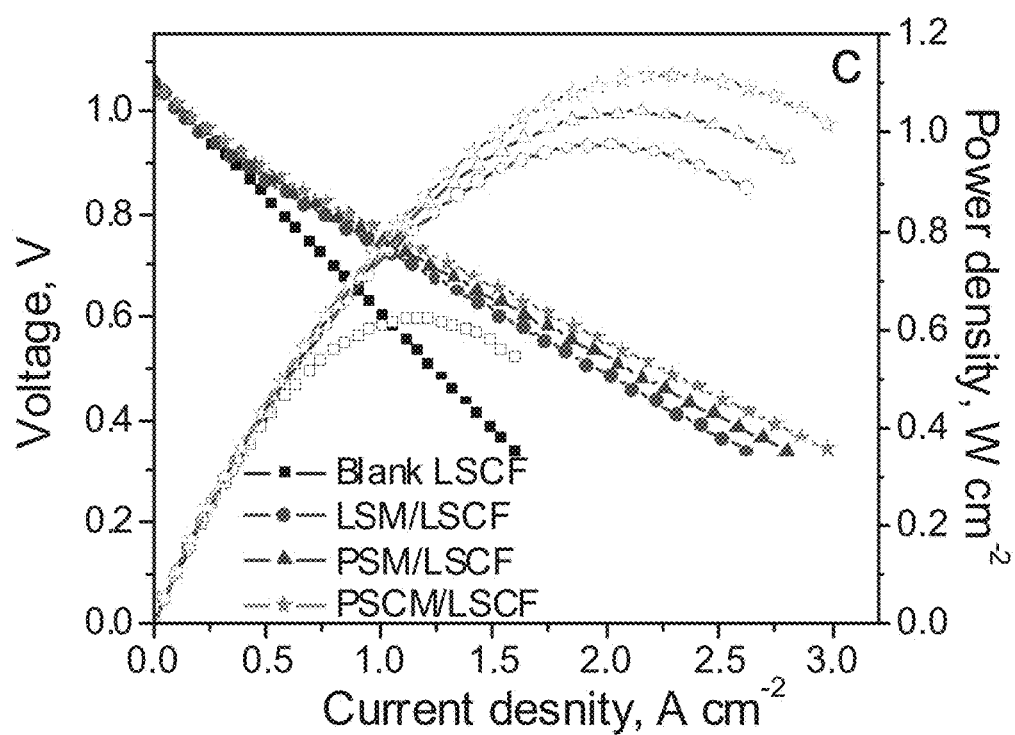
FIG. 13 is a graph of the current-voltage characteristics and the corresponding power densities for cells incorporating various infiltrated and un-infiltrated cathodes after long-term testing and illustrating aspects of their relative electrochemical performance, in accordance with the present disclosure.

FIG. 13 is a graph of the current-voltage characteristics and the corresponding power densities for cells incorporating various infiltrated and un-infiltrated cathodes after long-term testing and illustrating aspects of their relative electrochemical performance, in accordance with the present disclosure. Unexpectedly, the performance of the cell with a PSCM-infiltrated LSCF cathode was more than 60% better that the cell with an uncoated LSCF cathode. The improved performance is attributed to the high catalytic activity of the PSCM catalyst and the gradual degradation of the uncoated LSCF cathode, respectively.

The composition, design, and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrode of comprising:
   a porous mixed ionic-electronic conductor (MIEC); and
   an oxygen-reducing catalyst coating having a thickness in a range from about 1 to about 50 nm;
   wherein the oxygen-reducing catalyst coating comprises a perovskite having a composition $A_{1-x}A'_xBO_{3-\delta}$;
   wherein A comprises a praseodymium (Pr) element at the A-site of the perovskite, A' comprises a strontium (Sr) element at the A-site of the perovskite, and B comprises a manganese (Mn) element at the B-site of the perovskite; and
   wherein $0 \leq x < 1$.

2. An electrode comprising:
   a porous mixed ionic-electronic conductor (MIEC); and
   an oxygen-reducing catalyst coating having a thickness in a range from about 1 to about 50 nm;
   wherein the oxygen-reducing catalyst coating comprises a perovskite having a composition $A_{2-x}A'_xB_{2-y}B'_yO_{6-\delta}$;
   wherein A comprises a praseodymium (Pr) element at the A-site of the perovskite, A' comprises a strontium (Sr) element at the A-site of the perovskite, B comprises a cobalt (Co) element at the B-site of the perovskite, and B' comprises a manganese (Mn) element at the B-site of the perovskite; and
   wherein $0 < x \leq 1.2$ and $0 < y < 2$.

3. The electrode of claim 2, wherein x>0 and y>0, such that the oxygen-reducing catalyst coating is praseodymium strontium cobalt manganese (PSCM).

4. The electrode of claim 2, wherein $0.2 < x \leq 1.2$ and $0.2 < y < 1.9$.

5. The electrode of claim 2, wherein $0.4 < x \leq 1.1$ and $0.8 < y < 1.2$.

6. The electrode of claim 2, wherein x=1 and y=1.

7. A solid-oxide fuel cell comprising:
   an electrolyte;
   an anode electrically coupled to a first surface of the electrolyte; and
   a cathode electrically coupled to a second surface of the electrolyte, the cathode comprising the electrode of claim 1.

8. The electrode of claim 1, wherein the porous mixed ionic-electronic conductor is selected from a group consisting of lanthanum strontium manganite (LSM), lanthanum strontium cobalt ferrite (LSCF), strontium-doped samarium cobaltite (SSC), barium strontium cobalt ferrite (BSCF), praseodymium barium cobalt (PBC) and their derivatives.

9. The electrode of claim 1, wherein the oxygen-reducing catalyst coating is a continuous film.

10. The electrode of claim 1, wherein the electrode has a first interfacial resistance less than or equal to about 0.1 $\Omega cm^2$ at about 750° C.

11. The electrode of claim 1, wherein x>0, such that the oxygen-reducing catalyst coating is praseodymium strontium manganese (PSM).

12. The electrode of 1, wherein x<0.5.

13. The electrode of claim 1, wherein 0.1<x<0.3.

14. The electrode of claim 1, wherein x=0.25.

15. The electrode of claim 2, wherein the porous mixed ionic-electronic conductor is selected from a group consisting of lanthanum strontium manganite (LSM), lanthanum strontium cobalt ferrite (LSCF), strontium-doped samarium cobaltite (SSC), barium strontium cobalt ferrite (BSCF), praseodymium barium cobalt (PBC) and their derivatives.

16. The electrode of claim 2, wherein the oxygen-reducing catalyst coating is a continuous film.

17. The electrode of claim 2, wherein the electrode has a first interfacial resistance less than or equal to about 0.1 $\Omega cm^2$ at about 750° C.

18. A solid-oxide fuel cell comprising:
an electrolyte;
an anode electrically coupled to a first surface of the electrolyte; and
a cathode electrically coupled to a second surface of the electrolyte, the cathode comprising the electrode of claim 2.

* * * * *

UNITED STATES PATENT AND TRADEMARK OFFICE
CERTIFICATE OF CORRECTION

PATENT NO. : 9,914,649 B2
APPLICATION NO. : 14/707834
DATED : March 13, 2018
INVENTOR(S) : Dong Ding and Meilin Liu It is certified that error appears in the above-identified patent and that said Letters Patent is hereby corrected as shown below:

In the Specification

Column 1, Line 5, please insert:
-- STATEMENT REGARDING FEDERALLY SPONSORED RESEARCH
This invention was made with U.S. government support under Contract No. DE-NT0006557 awarded by the Department of Energy. The U.S. government has certain rights in the invention. --

Signed and Sealed this
Twenty-second Day of May, 2018

Andrei Iancu
*Director of the United States Patent and Trademark Office*